United States Patent [19]

Brueggemann et al.

[11] Patent Number: 5,808,545
[45] Date of Patent: Sep. 15, 1998

[54] INTEGRATED VEHICULAR ELECTRONIC SIGNALLING SYSTEM

[76] Inventors: Douglas C. Brueggemann, P.O. Box 20052, West Palm Beach, Fla. 33416-0052; Norman R. Dittmar, 525 5th Ave. NW., Rochester, Minn. 55901-2840

[21] Appl. No.: 679,742

[22] Filed: Jul. 15, 1996

Related U.S. Application Data

[63] Continuation of Ser. No. 246,407, May 20, 1994, abandoned.

[51] Int. Cl.$^6$ ........................................ B60Q 1/26
[52] U.S. Cl. .................. 340/468; 340/458; 340/477; 340/331; 340/309.15; 315/77; 315/200 A
[58] Field of Search ..................... 340/458, 468, 340/475, 477, 309.15, 331; 315/77, 200 A

[56] References Cited

U.S. PATENT DOCUMENTS 5,192,930   3/1993   Brueggemann et al. ............... 340/477

OTHER PUBLICATIONS

1987 Mazda RX-7 Workshop Manual, 1986 Mazda Motor Corporation, pp. 15-28.

*Primary Examiner*—Thomas Mullen
*Assistant Examiner*—Daryl C. Pope
*Attorney, Agent, or Firm*—Varnum, Riddering, Schmidt & Howlett LLP

[57] ABSTRACT

An electronic vehicular signalling system is disclosed. It has a novel turn signal switch having electromagnetic detents, novel electronic circuitry which provides all standard signalling functions and optionally features automatic cancellation of turn signal switch, an energy saving hazard warning mode, a police alert hazard warning mode, double-rate turn signal flashing on lamp burnout, Vehicular Lamp Status Display System, clicking sound in cadence with flashing or tone, and automatic turn signal timeout with choice of timeout intervals. Separate flasher units are not needed, nor a microprocessor.

14 Claims, 2 Drawing Sheets

INTEGRATED VEHICULAR ELECTRONIC SIGNALLING SYSTEM

This is a continuation of application Ser. No. 08/246,407, filed May 20, 1994, now abandoned.

REFERENCES CITED

Ford Light Truck Shop Manual, Helm, Inc., Detroit, Mich. 48207 1980 ed., p. 32-41-1

Oldsmobile Service Manual (Cutlass, et al), Oldsmobile Div., Service Dept., Lansing, Mich. 48921, 1989 ed., pp. 8a-110-0, ff.

U.S. Pat. No. 4,792,785,"Turn Signal Cancelling Apparatus for Use in Vehicles, Miyamaru Yukio, et al, Filed Sep. 14, 1982.

U.S. Pat. No. 5,247,280, "Combination Vehicle Flasher Having First and Second Flash Rates and Duty Rates", Michael D. Incorvaia, and Timothy W. Brooks, Filed Aug. 1, 1991

U.S. Pat. No. 5,260,685, "Time-Delayed Self Cancelling Turn Signal", David G. Parker, Filed Mar. 20, 1992

U.S. Pat. No. 5,264,827, "Vehicle Turn Signal Reminder Circuit", Henry P. Giovanni, Filed Mar. 19, 1992

U.S. Pat. Off. Ser. No. 08/192,015, "Vehicular Lamp Status Display System", Norman Dittmar, Filed Feb. 4, 1994.

BACKGROUND OF THE INVENTION

The present invention refers to vehicular signalling systems.

Consider a typical motor vehicle of the prior art having a signalling system comprising right and left, front and rear turn signal lamps, a turn signal switch with handle, a mechanical cancelling mechanism, a brake switch and brake lamps, a hazard warning flasher, a hazard warning switch with knob, and a dashboard, on which are turn signal indicators. There are also a system ground terminal, a battery for d.c. power, and a wiring harness.

The turn signal switch has three positions, Left, Off, and Right; there is a detent in each position.

For a schematic diagram of a typical signalling system of the prior art see Ford manual, loc. cit. In this system the two rear signal lamps double as brake lamps. During simultaneous braking and turn signalling, precedence is given to the turn signal signal function.

Two shortcomings of the prior art are that the cancelling mechanism does not work in a lane changing situation, and any clicking sounds made by the turn signal flasher while at highway speed are drowned out by road noise.

Some recent developments have addressed these two shortcomings: There is an alarm system which sounds off loudly if a turn signal is left to flash for more than a minute or so. (See Oldsmobile Manual, op. cit.). H. P. Giovanni's invention has additionally the restarting of the turn signal alarm timeout interval by the closing of the brake switch. These two devices do not cancel the turn signal switch, however.

Electrically cancelled turn signal switches have been referred to but not in connection with an automotive turn signal switch. Mayamaru Yukio, et al, refer to a prior-art electrically cancelled turn signal switch for motorcycles; David G. Parker has addressed the problem caused by a truck first swinging one way and then turning the other. His invention utilizes a prior-art electrically operated means of cancelling a turn signal switch, based upon steering wheel movements.

A remaining shortcoming of the prior art is the lack of a definite dashboard indication of the status of each signal lamp. Since c. 1989 the U.S. big-three manufacturers have been utilizing a transistorized turn signal flashers which provide flashing at double the standard rate when one lamp fails. (See also U.S. Pat No. 5,247,280 of Michael D. Incorvaia). These employ relays to simultaneously close contacts and make a clicking sound. The thermal flashers which were used extensively prior to 1989 provided a dimly lit dashboard indicator when one signal lamp failed.

An electronic system for the expressed purpose of providing deterministic display of lamp status has been disclosed in U.S. patent Ser. No. 08/192,015. The present invention uses this system, in its preferred embodiment.

SUMMARY OF THE INVENTION

The objects of the present invention are to provide an electronic signalling system which a) alleviates the three above cited shortcomings of the prior art, b) improves upon the performance of the standard signalling functions, and c) provides new functions which save energy or improve safety.

There are two main parts to the present invention: a turn signal switch which utilizes an electromagnet for Left detent and Right detent, and an electronic circuit which controls the signal lamps in such a way that all the standard signalling functions are performed and also has a timeout function which cancels the turn signal switch after a set number of flashes.

The preferred embodiment features the following items:
1. Brake-extended turn signal timeout function: The object of this is to provide a full turn signal timeout interval after the brake switch is opened.
2. Battery-saver hazard warning function: The object is to allow prolonged hazard warning signalling on battery only, by increasing the period of flashing whilst decreasing the duration of each MARK.
3. Vehicular Lamp Status Display System. (See Ser. No. 08/192,015).
4. A Police Alert and alternate-sides hazard warning functions.
5. Double-rate flashing when one signal lamp fails.

The turn signal switch (See FIG. 1) comprises a ferromagnetic yoke 6 having stomp arms 2 and 5 and a core 9, a lever 10, one arm of which is a switch handle 13, and the other arm of which is a ferromagnetic counterweight 3, a coil of magnet wire 8 with leads 12, a left contact 7, and a right contact 4. Core 9 extended is the shaft about which lever 10 pivots.

The electronic circuit comprises an audio frequency oscillator 49 (See FIG. 4), a multistage frequency divider 50 having a reset port 51, and a standard rate output port 54, an electronic switch 38 for driving the coil 8 of the turn signal switch, first, second, third, and fourth electronic switches 20, 31, 70, & 101 in series with each turn signal lamp 17, 36, 67, & 102 respectively, a counter 61 having a reset port 59 and output ports 57 and 58, and NAND-circuit unit (NAND) 39 which drives switch 38, final logic NORs 25, 29, 72, & 94, which drive said four electronic switches respectively, left and right brake ANDs 26 and 75, left and right turn signal NORs 27 and 77, hazard warning AND 74, NAND 47, OR 48, single-shot 42, and inverters 40, 76, and 85.

The oscillator 49 runs steadily whenever the system of the present invention is powered. The frequency divider 50 produces a square wave train at standard flasher frequency. This signal appears on output port 54.

When turn signal switch contact 7 is closed, NAND 47 enables NAND 39 and simultaneously causes single-shot 42 to generate a pulse which resets divider 50 and counter 61. The resultant logic 0 on port 57 completes NAND 39, causing coil 8 to conduct current and hold the turn switch lever in the Left position. NOR 27 supplies NORs 25 and 29 with a square wave at flasher frequency, thus causing left signal lamps 17 and 36 to flash.

After a set number of flashes the counter 61 supplies NAND 39 with a logic 0, taking away the current from coil 8.

While in magnetic detent the turn signal lever 10 can be forced away from the stop arm 2, breaking contact 4, removing the enable form NOR 39, and thus disabling coil 8.

The closing of the brake switch 65 causes NORs 26 and 75 to be completed on either side of the vehicle for which the turn signal switch contact is not closed.

When the hazard warning switch 63 is closed, AND 74 lets through the square wave train from port 54 to all four final logic NORs 25, 29, 72, & 94. OR 48 transmits a logic 1 to single-shot 42, resetting divider 50, so that the hazard warning train always starts with a MARK.

A general advantage of the present invention over the prior art in general is that it has more wiring in integrated circuits and less in the wiring harness.

DESCRIPTION OF THE PREFERRED EMBODIMENT

Figure 1:
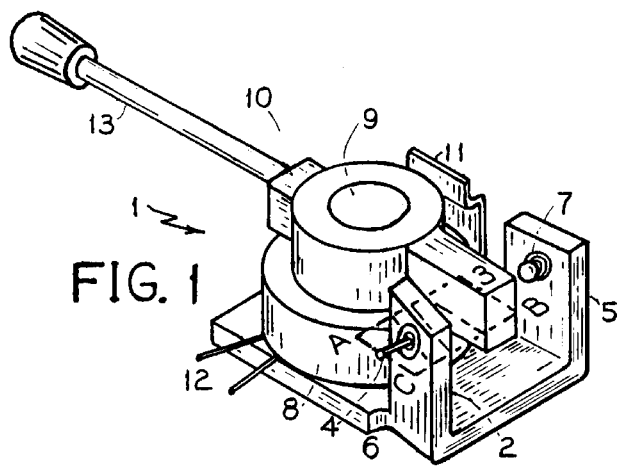
FIG. 1: Turn Signal Switch of the invention (Cancelling Mechanism not shown).
Figure 2:
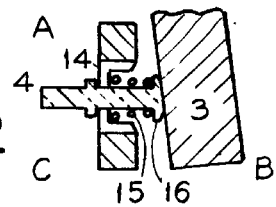
FIG. 2: Cross Sectional View of Stop Arm and Counterweight, sectioned along plane ABC, through center of contact, in momentary contact position
Figure 3:
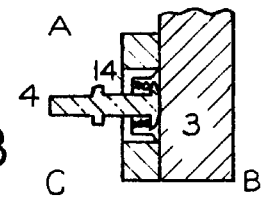
FIG. 3: Cross Sectional View as in FIG. 2, but with lever in magnetic detent

In the preferred embodiment the turn signal switch should be as large as necessary to achieve adequate electromagnetic detent force. The switch is symmetrical as viewed from the top. (See FIG. 1).

The spring return mechanism 11 may be a mechanism of the prior art which always tends to return lever 10 to the Off position, with a detent there.

Contact spring 15 must exert a force like that of the prior art when the turn signal switch is used for momentary signalling.

The magnetic detent force, which is exerted between stop arm 2 and counterweight 3, must be larger than the sum of the force of return mechanism 11 and the force in compression of said contact spring 15.

To build the turn signal switch I using ferromagnetic material of permeability p and cross sectional area A, for a nominal coil emf V, and coil radial winding space $r_M-r_m$, the cross sectional area $a_w$ of the magnet wire to be used in the coil 8 may be estimated by the formula:

$$a_w > \frac{2\pi}{P} \sqrt{\frac{\rho^2 F}{AV^2}} \cdot Lr_{av},$$

where

F is the desired detent force; $\mu_0$ the permeability of space. $\rho$ is the resistivity of the magnet wire;

$$r_{av} = \frac{r_M + r_m}{2}.$$

L is the length of the magnetic circuit through yoke & lever.

Then the power P to be dissipated in said coil is:

$$P = \frac{r_{av} \cdot F \cdot L^2}{f\mu_0\rho^2 \cdot 1(r_M - r_m) \cdot A}$$

where l is the length of the coil winding space, and f is the fraction of coil winding space occupied by copper.

The circuit of the preferred embodiment comprises that described in the Summary . . . above and has additional circuitry to perform the battery-saver hazard warning feature, a police-alert hazard warning flashing mode, an alternate side hazard warning mode, the Vehicular Lamp Status Display circuitry (See Ser. No. 08/192,015), turn signal double-rate flashing on burnout, and a brake-inhibited turn signal timeout function.

Figure 5:
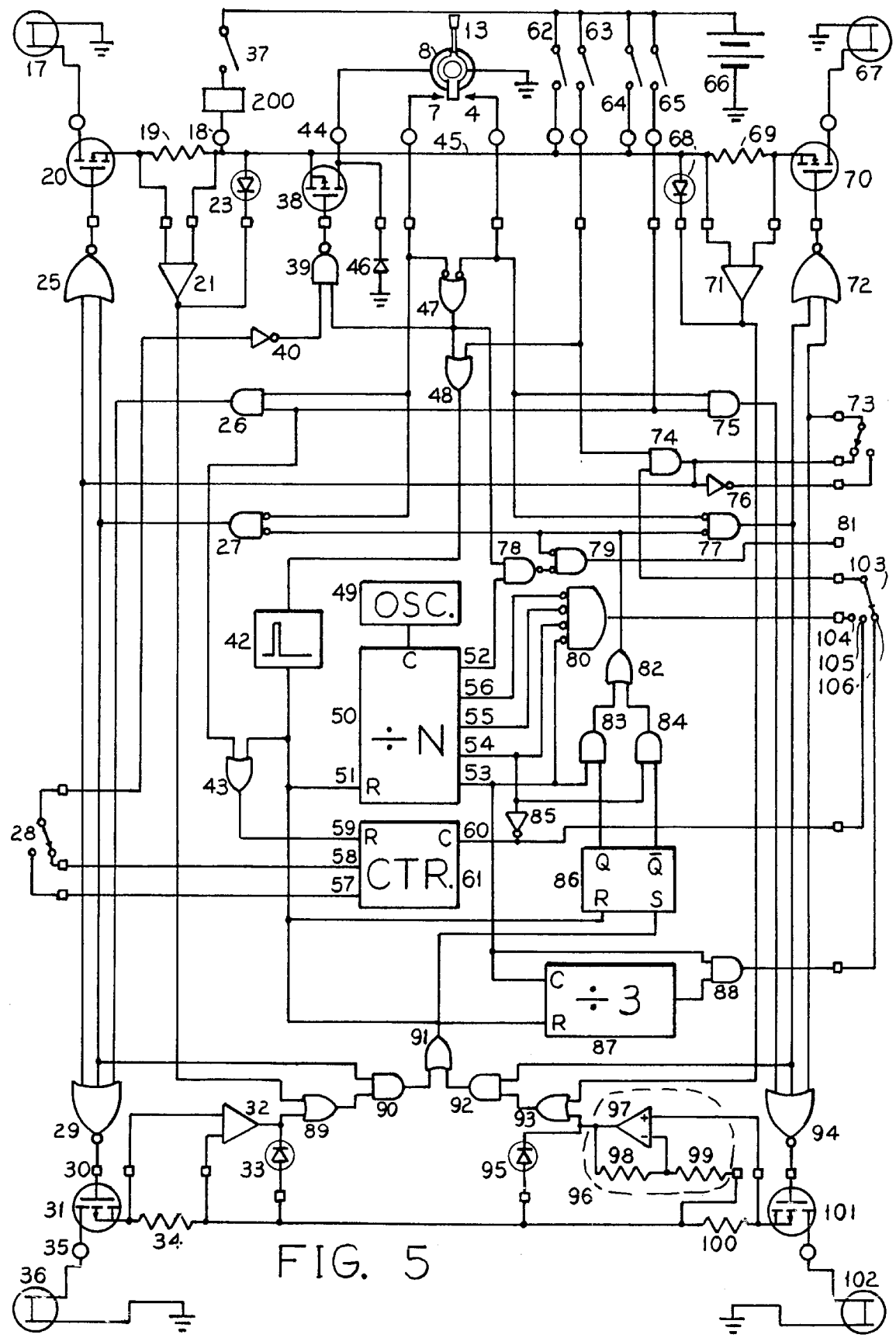
FIG. 5: Schematic Diagram of the Circuit of the Preferred Embodiment of the Invention

Divider 50 is clocked continually by oscillator 49; said divider has output ports 52–56 which have square waves whose respective frequencies are each an integral fraction of the preceding one. They are numbered in order of decreasing frequency in FIG. 5. The frequency at output port 54 is standard flasher frequency; 53 twice as fast, 55 twice as slow.

In the case of an electrically cancellable turn signal switch, the inverter 40 is omitted.

The battery-saver portion of the hazard warning circuitry comprises NOR 80 and switch 103 (having three positions: : 104, 105, & 106), in position 104. NOR 80 produces a train of pulses whose width is ½ standard MARK duration and whose period is four times standard. This feature is not available in the prior art.

The police-alert hazard warning mode circuitry comprises divide-by-3 unit 87, AND 88, and switch 103 in position 106. The divide-by-3 is clocked at two times standard flasher frequency. AND 88 comes out with a train consisting of blocks of three rapid MARKs followed by a SPACE of approx. one second, causing the lamps to send out an S.O.S. type signal. If a CD4018 be used as the divide-by-three, the output port is the inverted fourth stage port. This feature is not available in the prior art.

The alternate-sides-flashing circuitry comprises inverter 76 and a two-position switch (having regular and alternate positions) in the alternate position.

The Vehicular Lamp Status Display System comprises amplifier units 21, 32, 71, & 96, sensing resistors 19, 34, 69, & 100, and dashboard light-emitting diodes 23, 33, 68, & 95, respectively. Each comes ON if and only if the corresponding lamp is conducting current. Internal details of one amplifier unit are depicted by differential input amplifier 97, input resistor 99, and feedback resistor 98. This feature is not available in the prior art.

The double-rate-on-burnout feature comprises the four amplifier units, ORs 89, 93, & 91, ANDs 90 & 92, latch 86, ANDs 83 & 84, and OR 82. When turn signal NOR 27 produces a logic 1, current should flow through lamps 17 & 36. If not, OR 89 produces a logic 1, causing latch 86 to set via OR 91. Then AND 83 lets through the double-rate flashing train to NOR 27.

The small squares such as 22, 30, & 81 represent tabs of an integrated circuit chip. The preferred embodiment of the present invention has the maximum feasible number of electronic components on one chip. Net 45 is the power net for the circuitry.

Diode 46 discharges coil 8.

Figure 4:
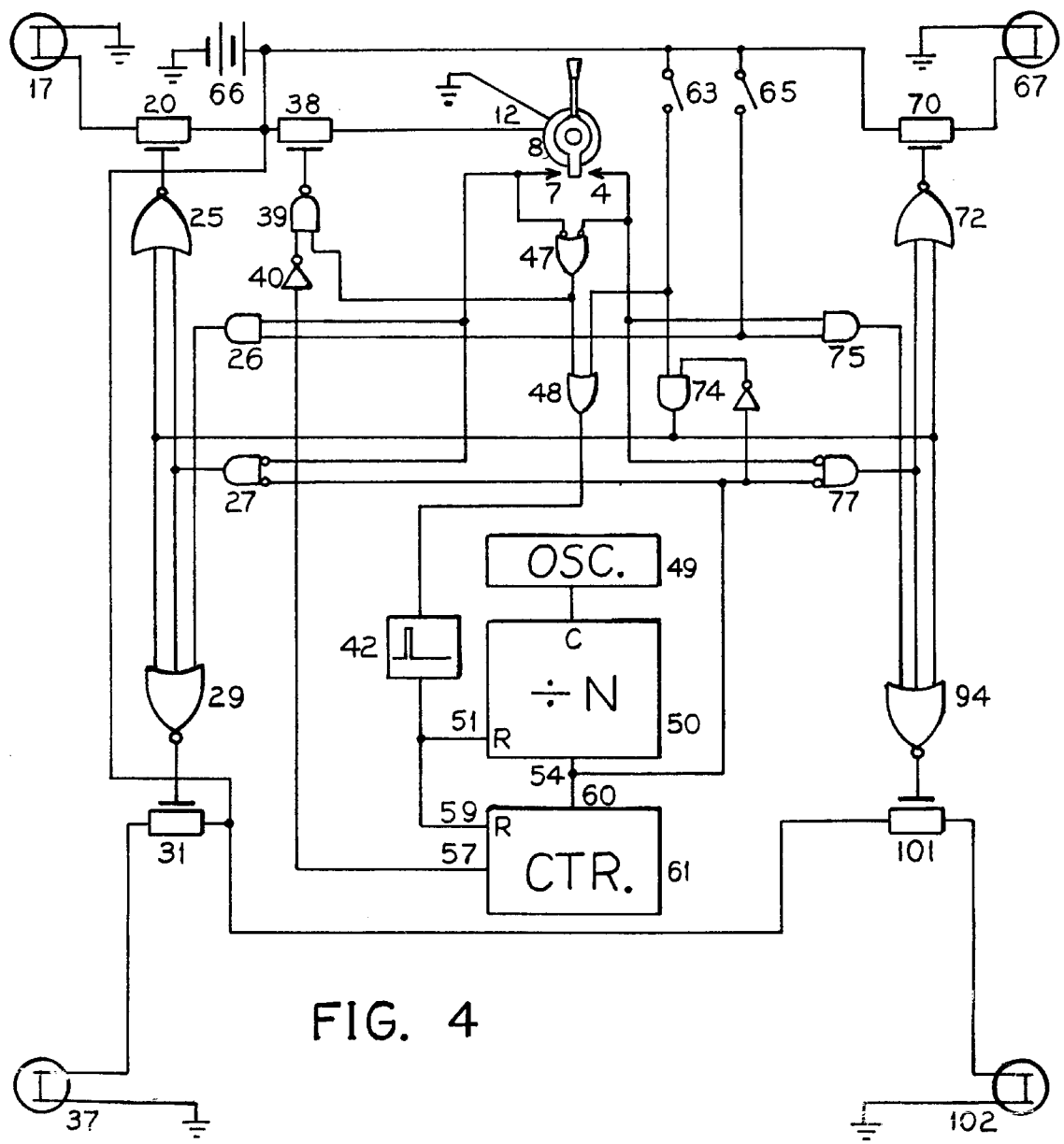
FIG. 4: Schematic Diagram of the Electronic Circuit of the Invention

If brake signalling and hazard warning signalling independent of ignition are desired, ignition switch 37 needs to be an independent pole which closes when the rest of the ignition switch closes. Likewise the hazard warning switch needs an auxiliary pole 62, and the brake switch needs an auxiliary pole 64. In vehicles for which the quiescent power consumption of the logic circuit is tolerable, or for which ignition is needed for all signalling, these switches may be as represented in FIG. 4.

The round circles such as 18, 35, etc. represent contacts to a printed circuit card upon which the chip resides. This card has one or more connectors which connect these contacts to a branch of the wiring harness. Inside this branch are wires that lead to the four signal lamps, a pair going to the turn signal switch, and several going to the hazard warning switch and whichever mode switches (28, 73, or 103) are used separately.

To provide a loud clicking sound in sympathy with turn signal flashing, a d. c. driven clapping means may be inserted between the ignition switch 37 and the power net 45 of the circuitry. The advantages over the relay-clicker flasher unit of the prior art are: louder sound by virtue of being designed solely to make noise, lower cost due to heavier magnet wire on coil, and no need for electrical contacts.

An audio frequency signal in sympathy with each MARK of a turn signal flashing sequence is obtained by making the frequency of oscillator 49 a multiple of an audio frequency. Audio frequency port 52 delivers a periodic train at audio frequency to logic units 78 & 79 which then deliver the desired signal to terminal 81.

The intensity of brake lamps 36 and 102 can be varied by outfitting to a brake pedal a brake pedal position sensor which produces a periodic wave train whose duty factor varies monotonically with the position of the brake pedal. The brake switch 65 is replaced by this sensor.

A brake lamp circuit separate from the turn signal circuits is used on some cars, e.g., a 1980 Buick Century. An advantage of this over the prior art at the time was that the turn signal switch needed only two harness wires rather than six. In the present invention only two are needed in either case.

We claim:

1. In a vehicle having left and right, front and rear signal lamps, a brake switch, a hazard warning switch, and a power source, an electronic signalling system comprising:

a manually operable three-position turn signal switch having Left, Off, and Right positions and further comprising an electromagnetic detent means in either Left or Right position and a terminal thereto, and an electrical contact for each of said Left and Right positions; and an electronic circuit configuration comprising:

an oscillator whose frequency is a multiple larger than a standard flashing frequency;

a frequency divider having a reset port, which divider is clocked by said oscillator and produces a periodic wave train at said standard flashing frequency on a standard-rate port;

a first electronic switch connected in series with said power source and said terminal of said electromagnetic detent means;

an electronic switch for each said signal lamp, connected in series with each said signal lamp and said power source;

a first logic circuit connected from said turn signal switch contacts, said standard-rate port, said brake switch, and said hazard warning switch to said electronic-switch-for-each-signal-lamp, to perform a standard vehicular turn signalling function, a standard vehicular hazard warning function, and a standard vehicular brake signalling function;

counter having a reset port, which counter is clocked by said frequency divider;

a single-shot having an input port and an output port, and a second logic circuit connected from said Left and Right turn signal switch contacts and said hazard warning switch to said input port and wherein said output port is connected to said frequency divider reset port and said counter reset port in parallel; and a third logic circuit connected from said turn signal switch contacts and said counter to said first electronic switch, so that said electromagnetic detent means is actuated whenever either said turn signal switch contact is closed, unless said counter has reached a set count;

said single shot producing a single resetting pulse for both said frequency divider and said counter whenever either of said turn signal contacts are closed or said hazard warning switch is closed;

a first logic subcircuit connected from said turn signal switch contacts and said counter to said first electronic switch, so that said electromagnetic detent means is actuated whenever either said turn signal switch contact is closed, unless said counter has reached a set count.

2. The electronic signalling system according to claim 1, further comprising a first OR unit connected from said brake switch and said single-shot to said counter reset port.

3. The electronic signalling system according to claim 1, further comprising:

a half-rate and a double-rate ports on said frequency divider;

a first logic unit connected from said half-rate port, from said standard-rate port, and from said double-rate port to produce a reduced duty factor pulse train.

4. The electronic signalling system according to claim 1, further comprising a lamp status display system comprising:

a current indicator unit in series with said power source and one of said signal lamps.

5. The electronic signalling system according to claim 1, further comprising:

a left turn signal train net and a right turn signal train net, and a double-rate port on said frequency divider;

a lamp status display system comprising a current indicator unit in series with each signal lamp;

a fourth logic circuit connected from said left turn signal train net, from said right turn signal train net, and from said current indicator units such that, on either side of the vehicle, if a logic level to produce a MARK occurs, and one or more of said current indicator units do not produce a logic level indicating current, then said first double-rate port is connected to said logic circuit in place of said standard-rate port.

6. The electronic signalling system according to claim 1, further comprising an audio-frequency port on said frequency divider, and a fifth logic circuit connected from said audio-frequency port, from said standard-rate port, and said turn signal switch contacts, to produce an audio frequency train during each MARK of a turn signal sequence.

7. The electronic signalling system according to claim 1, in which said logic circuit comprises:
- a first NAND unit connected from said turn signal switch contacts; a first inverter connected from said counter;
- a second NAND unit connected from said first inverter and said first NAND unit;
- a first AND unit connected from said turn signal switch left contact and from said brake switch;
- a second AND unit connected from said turn signal switch right contact and from said brake switch;
- a second inverter connected from said frequency divider standard-rate port;
- a third AND unit connected from said second inverter and from said hazard warning switch;
- a second OR unit connected from said hazard warning switch and from said first NAND unit;
- a first NOR unit connected from said turn signal left contact and from said frequency divider standard-rate port;
- a second NOR unit connected from said turn signal switch right contact and from said frequency divider standard-rate port;
- a third NOR unit connected from said third AND unit and from said first NOR unit, and a fourth NOR unit connected from said third AND unit and from said second NOR unit;
- a fifth NOR unit connected from said third AND unit, from said first NOR unit, and from said first AND unit, and a sixth NOR unit connected from said second AND unit, said second NOR unit, and third AND unit;
- first, second, third, and fourth P-channel field-effect transistors, each having a gate, a source, and a drain, with said drains connected to said left and right, front and rear signal lamps, respectively, and with said gates connected from said third, fourth, fifth, and sixth NOR units, respectively.

8. The electronic signalling system according to claim 1, further comprising:
- a double-rate port on said frequency divider;
- a divide-by-three counter having a clock port and an inverted fourth stage port, with clock port connected from said double-rate port;
- a fourth AND unit connected from said double rate port and from said inverted fourth stage port, to produce a periodic train having three pulses in each period.

9. A turn signal switch apparatus comprising:
- a ferromagnetic frame having a planar rectangular base having two sides and first and second ends, a right stop arm, and a left stop arm, which protrude up from along each long side toward the first end of said base and facing each other to form a U-shape, and also having toward the second end and centered between the long sides of said base, a cylindrical solid ferromagnetic core protruding perpendicularly upward from said base;
- a switch lever which pivots about uppermost part of said core in a plane parallel to said base, and having a rectangular solid ferromagnetic counterweight at one end of said lever and a standard handle at the other, such that said lever may pivot with said counterweight between said left and right stop arms, and a contiguous, closed magnetic circuit is formed when said counterweight touches either of said stop arms;
- a coil of magnet wire wound around said core and occupying space between said base and said lever;
- two insulated, spring loaded electrical contacts, one in each said stop arm, each having a head, such that said head touches said counterweight when said counterweight approaches said stop arm, and said head recedes into said stop arm when said counterweight is forced to touch said stop arm.

10. In a vehicle having left and right, front and rear signal lamps, a brake switch, a hazard warning switch, a power source, and an electrically cancellable turn signal switch having left and right contacts, an electronic signalling system comprising:
- an oscillator whose frequency is a multiple larger than a standard flashing frequency;
- a frequency divider having a reset port, which divider is clocked by said oscillator and produces a periodic wave train at said standard flashing frequency on a standard-rate port;
- a first electronic switch connected from said power source to said electrically cancelling means of said turn signal switch;
- an electronic switch for each said signal lamp connected in series with each said lamp and said power source;
- a first logic circuit connected from said turn signal switch contacts, said standard-rate port, said brake switch, and said hazard warning switch to said electronic-switch-for-each-signal-lamp, to perform a standard turn signal function, a standard hazard warning function, and a standard brake signalling function;
- a counter having a reset port, which counter is clocked by said frequency divider;
- a single-shot having an input port and an output port;
- a second logic circuit connected from said left and right turn signal switch contacts and said hazard warning switch to said input port, said output port connected to said frequency divider reset port and said counter reset port in parallel;
- whereby said single shot produces a single resetting pulse for both said frequency divider and said counter whenever either of said turn signal switch contacts are closed or said hazard warning switch is closed;
- a third logic circuit connected from said turn signal switch contacts and said counter to said first electronic switch, so that said turn signal switch is cancelled when said counter reaches a set count.

11. In an automotive vehicle having a turn signal switch and a hazard warning switch and a plurality of lamps an electronic signaling system responsive to input signals from the turn signal switch and the hazard warning switch to control the lamps to flash at a predefined flashing frequency, the signalling system comprising:
- an electronic oscillator providing an oscillator output signal at a selected frequency which is a multiple of the predefined flashing frequency;
- a frequency divider circuit connected to the oscillator circuit and responsive to the oscillator output signal at the selected frequency to generate a divider output signal;
- a logic circuit connected to the frequency divider circuit, the turn signal switch, the hazard warning switch and the lamps and responsive to the divider output signal to selectively operate the lamps at the predefined flashing frequency;

the frequency divider circuit generating a plurality of divider output signals at differing frequencies and the logic circuit selectively responsive to the plurality of divider output signals to selectively operate the lamps at a rate lower than the predefined flashing frequency.

12. The electronic signaling system in accordance with claim 11 wherein the frequency divider circuit generates a divider output signal at a predetermined frequency and the logic circuitry is responsive to the divider output signal at the predetermined frequency to generate a series of spaced apart output signals in a repetitive pattern designating a hazard warning mode.

13. The electronic signalling system in accordance with claim 11 and further comprising a power net, an ignition switch and a current driven clapping means connected between the ignition switch and the power net.

14. An electronic signalling system in a vehicle having left front and rear signal lamps and right front and rear signal lamps, a brake switch, a turn signal switch, a hazard warning switch and a power source, the electronic signalling system comprising:

an oscillator operative to provide an oscillator output signal at a predetermined frequency;

a frequency divider connected to the oscillator and responsive the oscillator output signal to selectively generate a plurality of periodic signals at various different frequencies;

a plurality of signal lamp switches, each operative to selectively connect the power source to one of the signal lamps; and a logic circuit connected to the turn signal switch, the brake switch, the hazard warning switch, the frequency divider and the signal lamp switches, the logic circuit responsive to the periodic signals from the frequency divider and responsive to operation of a selected one of the turn signal switch, the hazard switch and the brake switch to operate selected ones of signal lamp switches to activate the signal lamps at different periodic rates determined by the periodic signals.

* * * * *